Patented Sept. 25, 1934

1,974,817

UNITED STATES PATENT OFFICE 1,974,817

VAT DYESTUFFS OF THE DIBENZANTHRONE SERIES AND PROCESS OF MAKING SAME

David Clarence Rhys Jones, Ian Blohm Anderson, and Robert Fraser Thomson, Grangemouth, Scotland, assignors to Imperial Chemical Industries Limited, a corporation of Great Britain No Drawing. Application May 19, 1933, Serial No. 671,937. In Great Britain May 20, 1932

20 Claims. (Cl. 260—61)

This invention relates to the manufacture of vat dyestuffs which appear to belong to the benzanthrone series.

2,2'-dibenzanthronyl, as well as certain of its derivatives, is known to give dibenzanthrone or dibenzanthrone derivatives on fusion with caustic alkali or on treatment with certain reducing agents, in either case the process being carried out under appropirate conditions.

We have now found that 2,2'-dibenzanthronyl derivatives carrying substituents, especially negative substituents such as halogen atoms or nitro groups, of which some are very probably in the Bzl,-Bzl'-position, can be converted into vat dyestuffs by heating either alone or in a substantially inert medium such as substantially inert high boiling organic solvents or diluents, for example, phthalic anhydride or kerosene or sodium carbonate. The vat dyestuffs appear to belong to the benzanthrone series, being probably dibenzanthrone derivatives.

The process of conversion may be conveniently combined in some cases with the preparation of the 2,2'-dibenzanthronyl derivatives, by making these in the substantially inert high-boiling solvent or diluent and then without isolation effecting conversion into the vat dyestuff. Further, the production of the vat dyestuff may be combined with an after-treatment such as halogenation, without isolation.

One form of our invention consists in heating a halogenated especially a polyhalogenated 2,2'-dibenzanthronyl or a nitro-2,2'-dibenzanthronyl with a phthalic anhydride at a high temperature preferably at or near the boiling point of the mixture.

The following examples, in which parts by weight are given, illustrate but do not limit the invention.

Example 1

10 parts of chlorinated 2,2'-dibenzanthronyl containing 32% of chlorine, and produced by passing chlorine through 2,2'-dibenzanthronyl in molten phthalic anhydride at 180° C., are dissolved in 50 parts of molten phthalic anhydride and the mixture raised to the boil. After about 15 minutes the color changes to bluish-red; boiling is continued for a short time after this and the melt is partially cooled. It is then drowned in water, boiled and filtered, the residue being, if necessary, extracted with boiling water again, to remove all phthalic acid. The product is a blue-black powder containing 23% chlorine and dissolves in sulfuric acid with a reddish-blue color and dyes cotton blue shades from a bright blue alkaline hydrosulfite vat. It appears to be a chlorinated dibenzanthrone. The phthalic anhydride employed above for treating the chlorinated 2,2'-dibenzanthronyl may be replaced by 4-chlorophthalic anhydride with the production of a similar dyestuff.

Example 2

This is an example of the use as starting material of a substituted 2,2'-dibenzanthronyl which has been prepared in phthalic anhydride, but not isolated.

10 parts of 2,2'-dibenzanthronyl are dissolved in 100 parts of molten phthalic anhydride and chlorinated by bubbling chlorine through the molten mass at 180° C. until a sample freed from phthalic anhydride contains 26.7% chlorine. The mass is then raised to the boil, boiled for 6 hours, and the product then isolated as in Example 1. It consists of a blue vat dyestuff which appears similar to that described in Example 1 but contains only 15% chlorine.

Example 3

10 parts of brominated 2,2'-dibenzanthronyl, obtained by brominating 2,2'-dibenzanthronyl in aqueous suspension and containing 16.6% bromine are dissolved in 100 parts of molten phthalic anhydride. The mass is then raised to the boil and boiled until no further change is observed in the color of the solution. The product is isolated as in the two preceding examples and appears to be a similar dye.

Example 4

10 parts of dinitro-2,2'-dibenzanthronyl obtained by nitrating 2,2'-dibenzanthronyl in sulfuric acid are heated in boiling phthalic anhydride for 4 hours, and then isolated as in Example 1. The isolated product dissolves in sulfuric acid with a brown-violet color and dyes cotton from a violet-blue vat in reddish blue shades which become greenish-grey on oxidation.

Dyes giving somewhat different shades are obtainable by altering the heating time.

Example 5

4 parts of chlorinated 2,2'-dibenzanthronyl as employed in Example 1 are added to 100 parts kerosene having a boiling point of 225°–250° C. and the mixture boiled for 16 hours. The mixture is then cooled and the product is filtered from the kerosene. It is a dark blue substance, dissolving in sulfuric acid with a dark brownishviolet color. It dyes cotton in blue shades from a greenish-blue vat.

*Example 6*

20 parts of nitrated 2,2'-dibenzanthronyl prepared by nitrating 2,2'-dibenzanthronyl in nitrobenzene, are intimately mixed with 40 parts of sodium carbonate and the mixture heated at 280° C. for 2 hours. The mixture is then boiled with water to extract the soluble material and the insoluble residue obtained is a black substance which dyes cotton black shades from an alkaline hydrosulphite vat, after oxidation in the air.

In this reaction the sodium carbonate being an alkali may assist the reaction, but as it will take place in its absence the assistance can be regarded as accelerating the reaction and not as modifying its course.

It will be understood that many variations are possible in our procedure, without departing from the spirit of this invention.

In the claims below it should be understood that where new products, dyestuffs, or articles of manufacture are claimed, we mean to include these bodies not only in substance, but also in whatever state they exist when applied to material dyed, printed, or pigmented therewith.

We claim:

1. The process of producing a compound of the dibenzanthrone series which comprises heating a compound of the class consisting of halogen substituted 2,2'-dibenzanthronyl and nitro substituted 2,2'-dibenzanthronyl, in the absence of added condensing agents.

2. A compound of the dibenzanthrone series being substantially identical with the product obtained in claim 1.

3. The process of producing a compound of the dibenzanthrone series which comprises heating a compound of the class consisting of halogen substituted 2,2'-dibenzanthronyl and nitro substituted 2,2'-dibenzanthronyl in a high-boiling, inert medium in the absence of added condensing agents.

4. A compound of the dibenzanthrone series being substantially identical with the product obtained in claim 3.

5. The process of producing a compound of the dibenzanthrone series which comprises heating a compound of the class consisting of halogen substituted 2,2'-dibenzanthronyl and nitro substituted 2,2'-dibenzanthronyl, in an inert, high-boiling organic medium at a temperature above 225° C. and in the absence of added condensing agents.

6. A compound of the dibenzanthrone series being substantially identical with the product obtained in claim 5.

7. The process of producing a compound of the dibenzanthrone series which comprises heating a compound of the class consisting of halogen substituted 2,2'-dibenzanthronyl and nitro substituted 2,2'-dibenzanthronyl, in phthalic anhydride at a temperature near the boiling point of the mixture.

8. The process of producing a compound of the dibenzanthrone series which comprises heating a compound of the class consisting of halogen substituted 2,2'-dibenzanthronyl and nitro substituted 2,2'-dibenzanthronyl in a high boiling petroleum fraction, at a temperature above 225° C. and in the absence of added condensing agents.

9. The process of producing a compound of the dibenzanthrone series which comprises heating a polyhalogen 2,2'-dibenzanthronyl which is obtainable by halogenation of 2,2'-dibenzanthronyl, in a medium selected from the group consisting of phthalic anhydride and its halogen derivatives, at a temperature near the boiling point of the mixture.

10. The process of producing a vat dyestuff which comprises heating hexachloro-2,2'-dibenzanthronyl in phthalic anhydride near the boiling point of the mixture.

11. A vat dyestuff being substantially identical with the product obtained in claim 10.

12. The process of producing a vat dyestuff which comprises heating hexachloro-2,2'-dibenzanthronyl in kerosene at a temperature between 225 and 250° C.

13. A vat dyestuff being substantially identical with the product obtained in claim 12.

14. The process of producing a vat dyestuff which comprises heating dinitro-2,2'-dibenzanthronyl which is obtainable by nitrating 2,2'-dibenzanthronyl in sulfuric acid, in a melt of phthalic anhydride at a temperature near the boiling point of the mixture.

15. A vat dyestuff being substantially identical with the product obtained in claim 14.

16. The process of producing a vat dyestuff, which comprises reacting upon 2,2'-dibenzanthronyl with a reagent of the group consisting of halogenating and nitrating agents and then heating the resulting product in a high-boiling, inert organic solvent, to effect ring-closure to a dibenzanthrone compound.

17. The process of producing a vat dyestuff, which comprises subjecting 2,2'dibenzanthronyl to halogenation in a high-boiling inert organic medium and further heating the mass at a temperature near its boiling point to effect dyestuff formation.

18. The process of producing a vat dyestuff, which comprises subjecting 2,2'-dibenzanthronyl to chlorination in molten phthalic anhydride, and further heating the mass at a temperature near its boiling point, until dyestuff formation is substantially complete.

19. The process which comprises ring closing a compound of the class consisting of halogen substituted 2,2'dibenzanthronyl and nitro substituted 2,2'-dibenzanthronyl, to give a dibenzanthrone body.

20. The process which comprises ring closing hexachloro-2,2'-dibenzanthronyl to give a tetrachlorodibenzanthrone.

DAVID CLARENCE RHYS JONES.
IAN BLOHM ANDERSON.
ROBERT FRASER THOMSON.